(12) United States Patent
Balasaygun et al.

(10) Patent No.: US 9,277,021 B2
(45) Date of Patent: Mar. 1, 2016

(54) SENDING A USER ASSOCIATED TELECOMMUNICATION ADDRESS

(75) Inventors: Mehmet C. Balasaygun, Freehold, NJ (US); Douglas M. Grover, Westminster, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 941 days.

(21) Appl. No.: 12/623,427

(22) Filed: Nov. 22, 2009

(65) Prior Publication Data

US 2011/0044440 A1   Feb. 24, 2011

Related U.S. Application Data

(60) Provisional application No. 61/235,838, filed on Aug. 21, 2009.

(51) Int. Cl.

| | |
|---|---|
| *H04M 11/00* | (2006.01) |
| *H04L 29/08* | (2006.01) |
| *G06F 9/54* | (2006.01) |
| *H04L 29/06* | (2006.01) |
| *H04M 7/00* | (2006.01) |
| *H04M 3/42* | (2006.01) |
| *H04W 4/02* | (2009.01) |
| *H04W 64/00* | (2009.01) |

(52) U.S. Cl.
CPC ............... *H04L 67/24* (2013.01); *G06F 9/543* (2013.01); *H04L 65/403* (2013.01); *H04L 67/04* (2013.01); *H04L 67/306* (2013.01); *H04M 7/0057* (2013.01); *H04W 4/02* (2013.01); *H04W 64/00* (2013.01)

(58) Field of Classification Search
CPC ................................ H04M 3/382; H04M 3/56

USPC .............. 379/211.01, 211.02, 93.03; 455/415
See application file for complete search history.

(56) References Cited

U.S. PATENT DOCUMENTS

| | | | |
|---|---|---|---|
| 6,631,258 B1 * | 10/2003 | Chow et al. .................... | 455/417 |
| 6,690,770 B2 * | 2/2004 | Brandt .............. | H04M 3/42391 379/52 |

(Continued)

FOREIGN PATENT DOCUMENTS

WO    WO 2006/128171    11/2006

OTHER PUBLICATIONS

Extended European Search Report with Search Opinion for European Patent Application No. 10190302.9, dated Jul. 6, 2011 6 pages.

(Continued)

*Primary Examiner* — Solomon Bezuayehu
(74) *Attorney, Agent, or Firm* — Sheridan Ross P.C.

(57) ABSTRACT

One or more participants in a communication are authenticated using an authentication metric such as a face print or voice print. A single telecommunication address (or one for each participant) that is not associated with a communication device and is associated with at least one of the participants is determined. The telecommunication address (or addresses) is sent during the initiation of a communication session.

Other embodiments provide for sending a single associated telecommunications address, individual identifiers of each of the participants, and a communication device name to better identify exactly who is calling. The system can also detect when an additional participant has joined the communication session and when a participant leaves the communication session.

34 Claims, 7 Drawing Sheets

(56) References Cited

U.S. PATENT DOCUMENTS

| | | | |
|---|---|---|---|
| 6,747,685 B2 | 6/2004 | Taib et al. | |
| 6,959,074 B2 | 10/2005 | Berstis | |
| 7,266,189 B1 | 9/2007 | Day | |
| 7,738,912 B1* | 6/2010 | Hawkins | H04M 1/274558 455/550.1 |
| 2003/0195930 A1 | 10/2003 | Henrikson et al. | |
| 2005/0232409 A1* | 10/2005 | Fain | H04M 3/523 379/265.02 |
| 2007/0104180 A1* | 5/2007 | Aizu et al. | 370/352 |
| 2007/0288562 A1 | 12/2007 | Shaffer et al. | |
| 2008/0016156 A1* | 1/2008 | Miceli et al. | 709/204 |
| 2008/0187108 A1* | 8/2008 | Engelke | G10L 15/265 379/52 |
| 2008/0226055 A1* | 9/2008 | Holder | H04M 1/642 379/210.01 |
| 2008/0256182 A1* | 10/2008 | Sekaran | H04L 12/1822 709/204 |
| 2009/0086943 A1* | 4/2009 | Jain | H04M 3/56 379/142.04 |
| 2009/0239502 A1* | 9/2009 | Dempo et al. | 455/411 |
| 2009/0282103 A1 | 11/2009 | Thakkar et al. | |
| 2009/0323919 A1* | 12/2009 | Toner et al. | 379/211.02 |
| 2012/0128140 A1 | 5/2012 | Balasaygun et al. | |
| 2012/0143605 A1 | 6/2012 | Thorsen et al. | |
| 2012/0300914 A1* | 11/2012 | Baccay | 379/88.12 |

OTHER PUBLICATIONS

Henning Schulzrinne, "Personal Mobility for Multimedia Services in the Internet," IDMS 96 (European Workshop on Interactive Distributed Multimedia Systems and Services), Berlin, Germany, Mar. 4-6, 1996, pp. 1-18.

Notice of Allowance for U.S. Appl. No. 13/355,113 mailed Dec. 16, 2013, 9 pages.

Official Action for U.S. Appl. No. 13/355,113, mailed Jun. 26, 2013 9 pages.

Extended Search Report for European Patent Application No. 12185547.2, dated May 2, 2013 6 pages.

* cited by examiner

SENDING A USER ASSOCIATED TELECOMMUNICATION ADDRESS

RELATED U.S. PATENT APPLICATION DATA

This application claims the benefit under 35 U.S.C. §119(e) of U.S. Provisional Patent Application No. 61/235,838, filed Aug. 21, 2009, entitled "MOJO."

TECHNICAL FIELD

The system and method relates to communication systems and in particular to sending telecommunication information during the initiation of communication sessions.

BACKGROUND

Existing telecommunications systems have traditionally associated a specific telephone number and a single caller ID to a specific device/trunk. When a call is placed from a specific phone/trunk (e.g., a cell phone), the telephone number that was sent with the assigned caller ID is specific to the phone/trunk; this happens, regardless of who is actually calling. This causes problems when the person who is calling is different from the caller ID assigned to the specific phone/trunk. The caller ID will state that one person is calling, when in fact the call is actually from another person.

This problem gets worse when there are multiple parties calling from the same device; the caller ID will only indicate that a one person is calling, when in fact there are multiple parties calling. Some systems attempt to address this problem after a conference call is set up. For example, U.S. Pat. No. 7,266,189 describes a system that identifies who is speaking after a conference call is set up; however, the problem still exists that the parties are not identified prior to the initiation of the call.

SUMMARY

The system and method are directed to solving these and other problems and disadvantages of the prior art. One or more participants in a communication are authenticated using an authentication metric such as a face print or voice print. A single telecommunication address (or one for each participant) that is not associated with a communication device and is associated with at least one of the participants is determined. The telecommunication address (or addresses) is sent during the initiation of a communication session.

Other embodiments provide for sending a single associated telecommunications address, individual identifiers of each of the participants, and a communication device name to better identify exactly who is calling. The system can also detect when an additional participant has joined the communication session and when a participant leaves the communication session.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
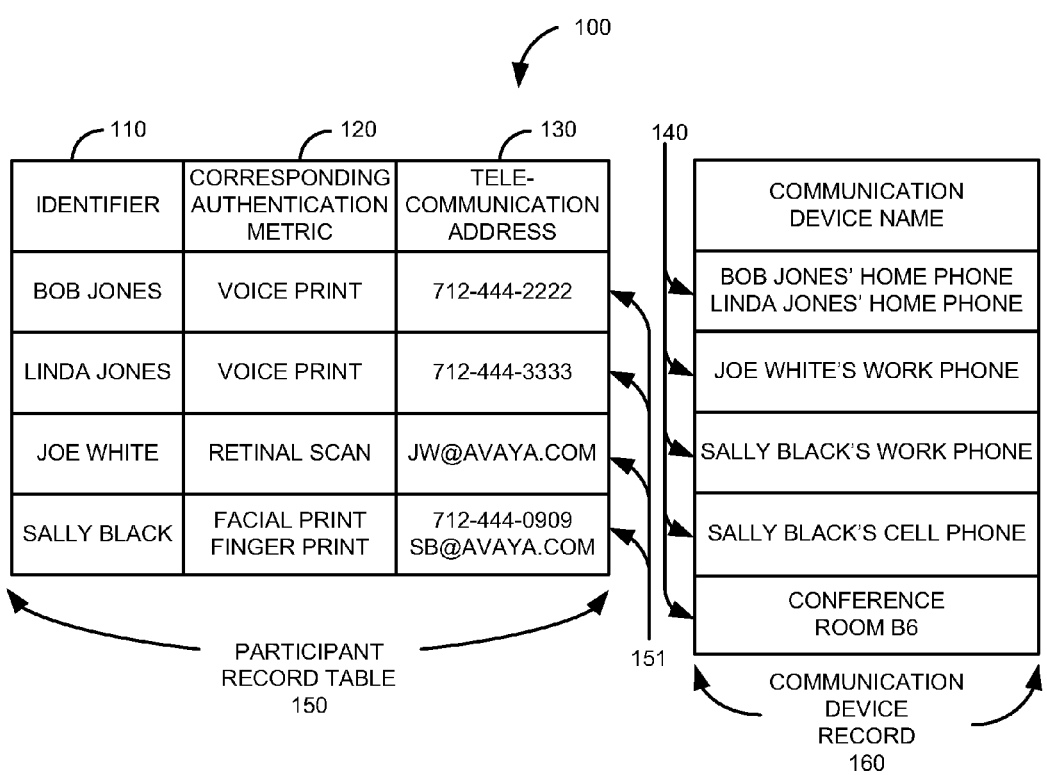
FIG. 1 is a diagram of an exemplary database for use in sending telecommunication information.

FIG. 1 is a diagram of an exemplary database 100 for use in sending telecommunication information. The database 100 comprises a participant record table 150 and a communication device record 160. The database 100 can be any medium for storing information such as a relational database, a directory service, a file system, a spreadsheet, and the like. The database 100 is shown in an illustrative manner and may be organized in various ways, depending on implementation and/or the type of database 100 used.

The participant record table 150 comprises one or more participant records 151. Each participant record 151 is a row in the participant record table 150. Each participant record 151 has an identifier 110 of a person, a corresponding authentication metric(s) 120, and an associated telecommunication address 130 (or addresses). The identifier 110 identifies an individual person. The authentication metric 120 can be any type of authentication metric 120 used to identify the individual person or when the individual person will be participating in a communication session. For example, an authentication metric can be a voice print, a face print, a retinal scan, a password, a finger print, a scheduled time period, a combination of these, and the like. The authentication metric 120 in the database 100 would typically be represented by a pointer to the authentication metric 120.

A telecommunication address 130 can be any address used to set up a communication session such as a numeric telephone number, an alpha-numeric telephone number, a Universal Resource Locator (URL), an Internet Protocol (IP) address, and the like. The telecommunication address 130 is associated with the person identified by the identifier 110; the telecommunication address 130 is not associated with a communication device. A user may have multiple telecommunication addresses 130. For example, in the database 100, Sally Black has two telecommunication addresses 130, SB@AVAYA.COM and 712-444-0909. Typically, each person would have a unique telecommunication address (or addresses) 130. However, two or more users can share a single telecommunications address 130.

The communication device record 160 comprises one or more communication device names 140. A communication device name 140 is a name associated with a specific communication device such as a telephone, a videophone, a Personal Computer (PC), a Personal Digital Assistant (PDA), and the like. The communication device name 140 is a name assigned to the communication device. There may be more than one name associated with a communication device. For example, the home phone for Bob and Linda Jones has two communication device names 140: Bob Jones' home phone and Linda Jones' home phone. The communication device name 140 may or may not indicate a relationship to a specific person. For example, Bob Jones' home phone indicates a relationship to Bob Jones, whereas the phone in conference room B6 does not have a person related to it. The communication device names 140 are illustratively shown as part of the database 100. However, the communication device names 140 can exist and/or be programmed locally in each communication device, separate from the database 100.

Figure 2:
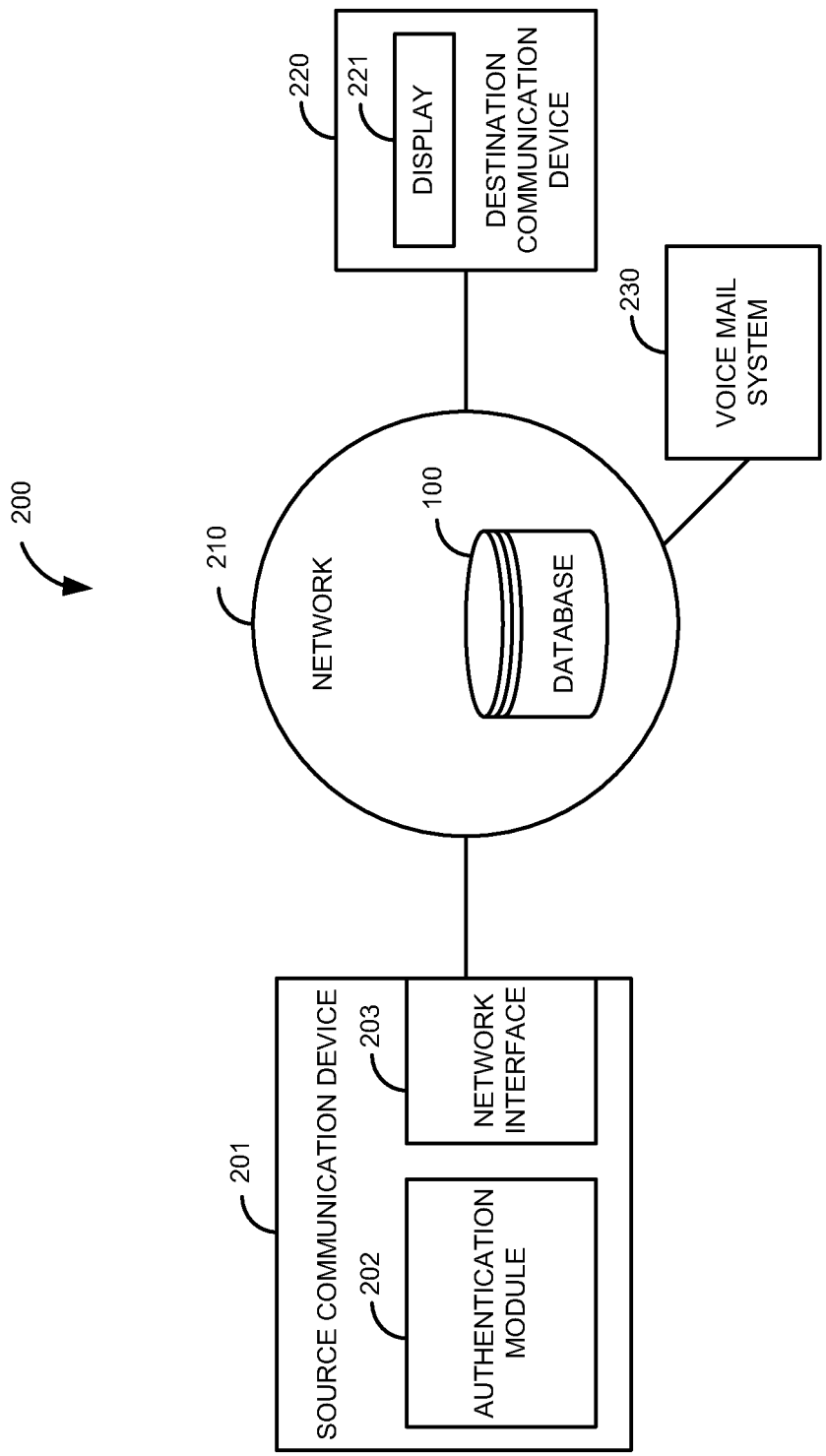
FIG. 2 is a block diagram of a first illustrative system for sending telecommunication information.

FIG. 2 is a block diagram of a first illustrative system 200 for sending telecommunication information. The first illustrative system 200 comprises a source communication device 201, a network 210, a destination communication device 220, and a voicemail system 230. The source communication device 201 and the destination communication device 220 can be any type of communication device such as a telephone, a videophone, a cellular telephone, a PC, a PDA, and the like. The source communication device 201 also comprises an authentication module 202 and a network interface 203. The authentication module 202 can be any type of device capable of authenticating a person using authentication metrics 120 such as voice print, a face print, a retinal scan, a password, a scheduled time period, and the like. The network interface 203 can be any device capable of providing access to the network 210 such as a network interface card, a modem, a wireless card, a cellular interface, and the like. The authentication module 202 and the network interface 203 are shown together in the source communication device 201. However, the authentication module 202 and the network interface 203 can be in separate devices.

The network 210 comprises the database 100 and various network elements (not shown) for sending data across the network 210 such as routers, switches, bridges, and the like. The network 210 can be any type of network 210 such as the Internet, a Wide Area Network (WAN), a Local Area Network (LAN), a cellular network, a wire (point-to-point connection) and/or any combination of the above, and the like. The database 100 is shown in the network 210. However, the database 100 may be in the source communication device 201, the destination communication device 220, the network 210, or distributed between any of these.

One or more participants (not shown) in a communication session between the source communication device 201 and the destination communication device 220 are authenticated by the authentication module 202. Each individual participant is authenticated by using a corresponding authentication metric 120 to verify the identity of each participant at the source communication device 201. Each of the corresponding authentication metrics 120 are not a telecommunication address 130. If a participant cannot be authenticated by the authentication module 202, the authentication module 202 can identify the participant with an identifier 110 that indicates an unknown participant. The authentication module 202 gets at least one telecommunication address 130 that is associated with one or more of the individual participants. The telecommunication address 130 is not associated with the source communication device 201 or the destination communication device 220; instead the telecommunication address is associated with a participant (person) in the communication session. The network interface 203 sends during the initiation of the communication session, the telecommunication address (or addresses) associated with one or more of the participants to the destination communication device 220 or the voicemail system 230.

Figure 3:
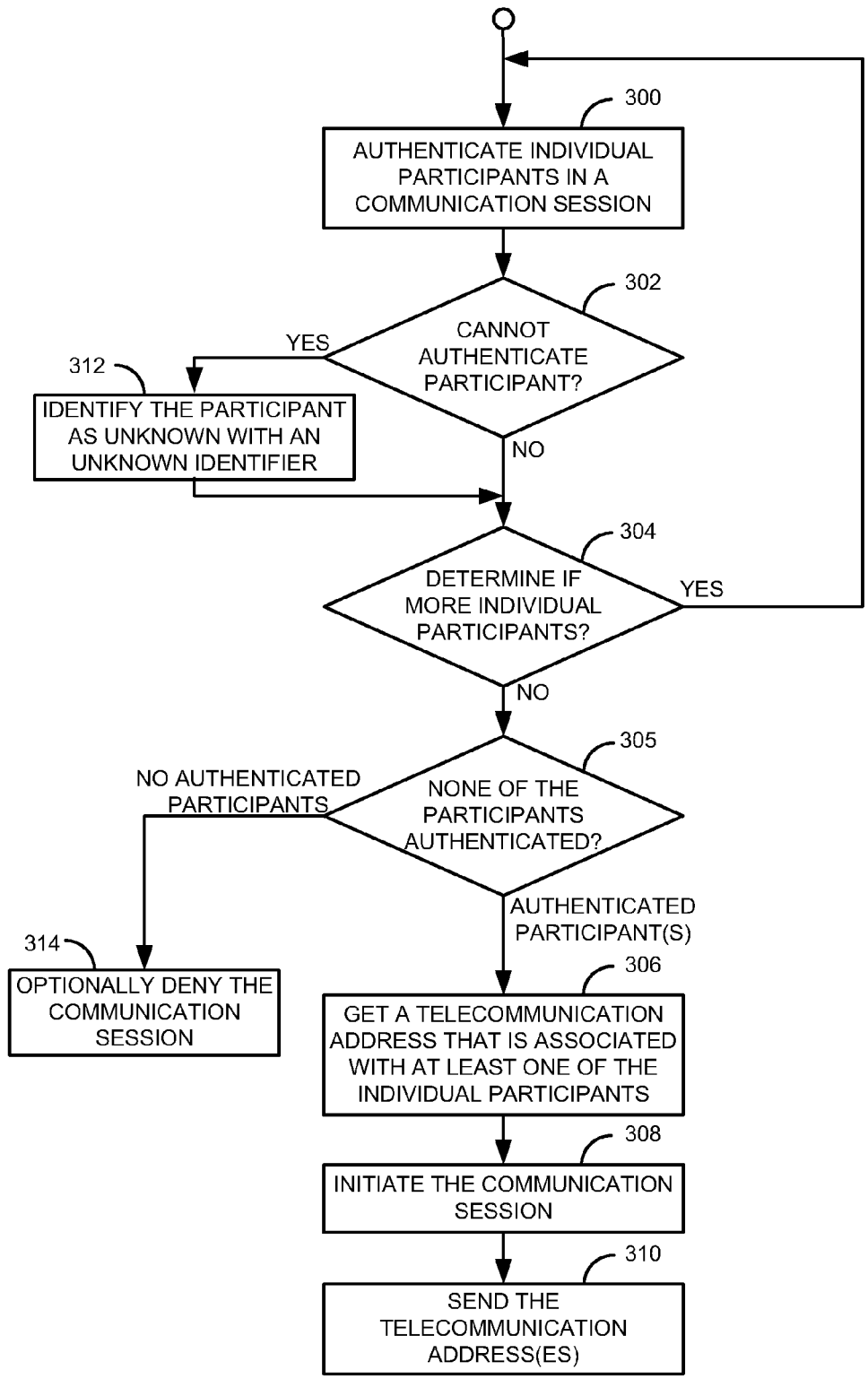
FIG. 3 is a flow diagram of a method for sending telecommunication information.

FIG. 3 is a flow diagram of a method for sending telecommunication information. Illustratively, the database 100, the source communication device 201, destination communication device 220, and the voicemail system 230 are stored-program-controlled entities, such as a computer or processor, which performs the method of FIGS. 3-7 by executing a program stored in a storage medium, such as a memory or disk.

The process begins when the authentication module 202 authenticates 300 an individual participant in a communication session with a corresponding authentication metric 120. If the participant cannot be authenticated with an authentication metric 120 from the database 100, in step 302, the authentication module 202 identifies 312 the participant as unknown by using an unknown identifier 110 and the process goes to step 304. Otherwise, if the participant can be authenticated in step 302, the process determines in step 304 if there are more individual participants. If there are more individual participants in step 304, the process goes back to step 300.

There are various ways that the authentication module 202 can authenticate multiple participants. For example, a videophone can detect multiple participants in a room using facial recognition for each participant. The facial prints are individually authenticated in step 300 to the corresponding authentication metrics 120 in the database 100. This process could be used for other types of authentication metrics 120 such as voice prints, finger prints, and the like.

If there are no more individual participants in step 304, authentication module 202 determines in step 305 if at least one participant has been authenticated in step 300. The authentication module 202 can initiate step 305 based on one of the participants dialing the telephone number of the destination communication device 220 or using other known techniques. If none of the participants can be authenticated in step 305, the authentication module 202 can optionally deny 314 the communication session. Otherwise, if at least one participant can be authenticated, in step 305, the authentication module 202 gets 306 at least one telecommunication address 130 that is associated with at least one of the authenticated individual participants. The network interface 203 initiates 308 the communication session. The network interface 203 sends the telecommunication address (or addresses) 130 during the initiation of the communication session. For example, the communication address 130 can be sent using traditional caller ID techniques.

Figure 4:
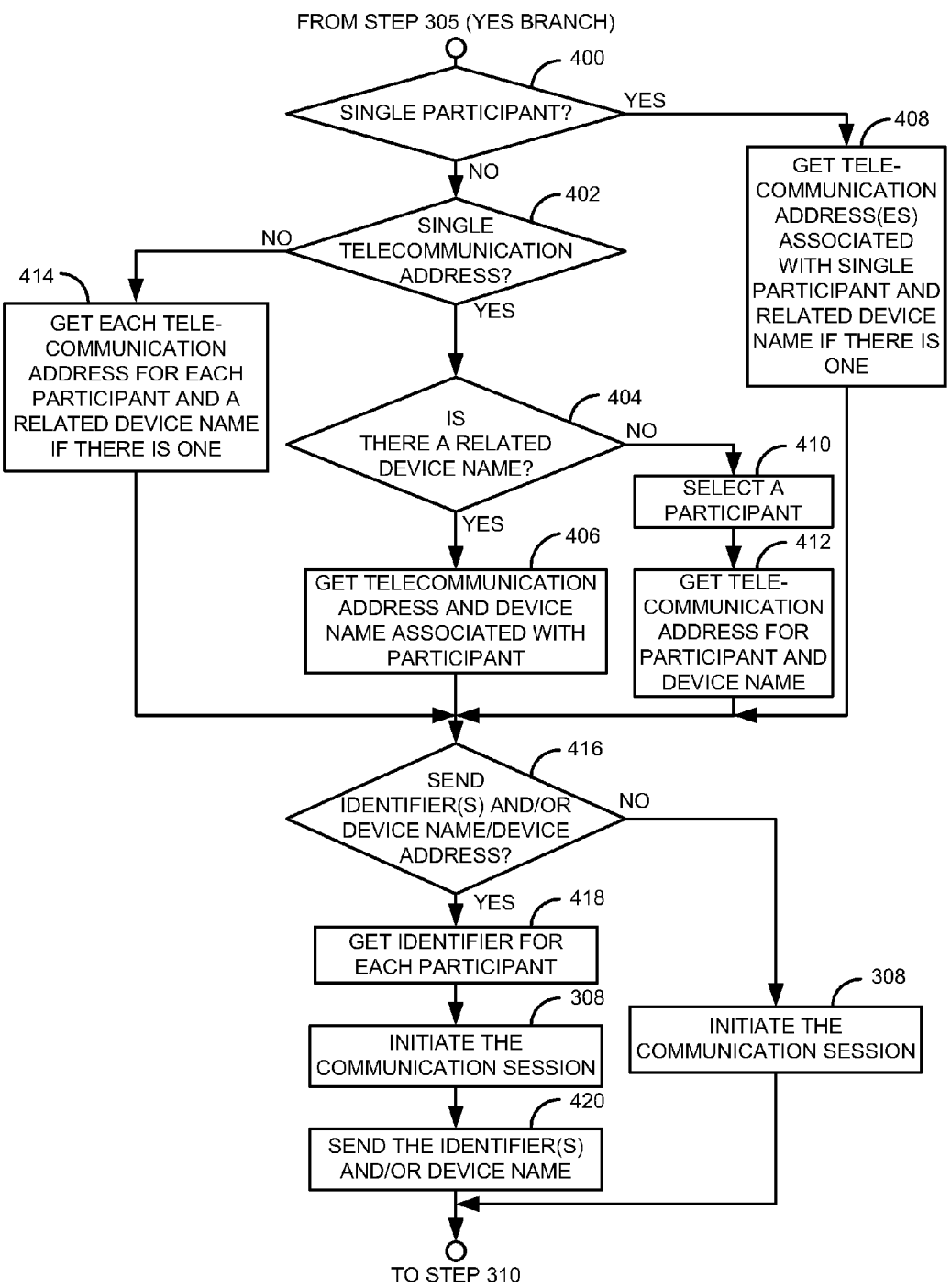
FIG. 4 is a flow diagram of a method for determining how to send telecommunication information.

FIG. 4 is a flow diagram of a method for determining how to send telecommunication information. FIG. 4 describes a different embodiment based on the embodiment shown in FIG. 3. The process continues from step 305 in FIG. 3 after the determination that at least one participant was authenticated. The authentication module 202 determines in step 400 if there is a single participant. If there is a single participant in step 400, the authentication module 202 gets 408 the telecommunication address 130 associated with the single participant and a related communication device name 140 for the source communication device 201 if there is one. A related communication device name 140 is a communication device name 140 that has a relationship with one of the participants on the communication session. For example, if Linda Jones is calling from her home phone, the related communication device name 140 would be "Linda Jones' home phone." On the other hand, if Bob Jones is calling from the same home phone, the related communication device name 140 would be "Bob Jones' home phone." If there is not a related communication device name 140 (e.g., Conference Room B6), the authentication module 202 would get a communication device name 140 that is not related to a call participant. If there are multiple communication device names 140, but none are related to the single participant, the authentication module 202 can pick one of the unrelated communication names 140 based on various criteria. For example, the authentication module 202 could randomly pick one of the communication device names or pick one of the communication device names based on the called telecommunication address. The above process for selecting related and unrelated communication device names 140 can also be used in steps 406, 412, and 414, which are described later.

If the single participant in step 408 has multiple telecommunication addresses 130 (e.g., Sally Black in the database 100), the authentication module 202 can get the multiple telecommunication addresses 130 associated with the participant or could get just one of the telecommunication addresses 130 associated with the single participant in step 408. This can be done on various criteria. The process then goes to step 416.

Otherwise, if there is not a single participant in step 400, the authentication module 202 determines in step 402 if a single telecommunication address 130 is to be sent. If a single telecommunication address 130 is not to be sent in step 402, the authentication module 202 gets 414 each telecommunication address 130 (or addresses if a participant has more than one telecommunication address 130, see Sally Black in FIG. 1) for each participant and a related communication device name 140 for the source communication device 201 if there is one. If there is not a related communication device name 140, the authentication module 202 can use an unrelated communication device name 140. If there are multiple related communication device names 140 related to multiple participants, the authentication module 202 can pick a communication device name 140 based on various criteria. The process then goes to step 416.

Otherwise, if a single telecommunication address 130 is to be used in step 402, the authentication module 202 determines in step 404 if there is a related communication device name 140. If the authentication module 202 determines in step 404 that there is not a related communication device name 140, the authentication module 202 selects 410 one of the participants. The authentication module 202 gets 412 the telecommunication address 130 associated with the selected participant and selects a communication device name 140 for the source communication device 201. The process then goes to step 416.

Otherwise, if there is a related communication device name 140 in step 404, the authentication module 202 gets 406 the telecommunication address 130 associated with the participant and gets the related communication device name 140. The process then goes to step 416.

The authentication module 202 determines in step 416 if identifier(s) 110, a communication device name 140, and/or a telecommunication address associated with the source communication device 201 are to be sent. The source communication device 201 may have an associated telecommunication address. For example, conference room B6 may have an associated telecommunication address because there are no participants associated with conference room B6. The authentication module can send a telecommunication address associated with the source communication device 201 if there is not a call participant associated with the source communication device 201. If the identifier(s) 110, the communication device name 140 and/or the source communication device telecommunication address are not to be sent in step 416, the network interface 203 initiates 308 the communication session and the process goes to step 310 in FIG. 3. Otherwise, if the identifier(s) 110 and/or communication device name 140 are to be sent in step 416, the authentication module 202 gets 418 the identifiers 110 for each participant. If an identifier 110 is an unknown participant (determined in step 312), the network interface 203 can also send the unknown identifier.

For example, if Sally Black is calling from her work phone along with Jack Green (who is unknown in the database 100), then the sent information would be Sally Black (110) and an unknown participant (110) are calling from Sally Black's work phone (140). The network interface 203 initiates 308 the communication session. The network interface 203 sends 420 the identifiers 110 and/or the communication device name 140. The process goes to step 310 in FIG. 3.

Figure 5:
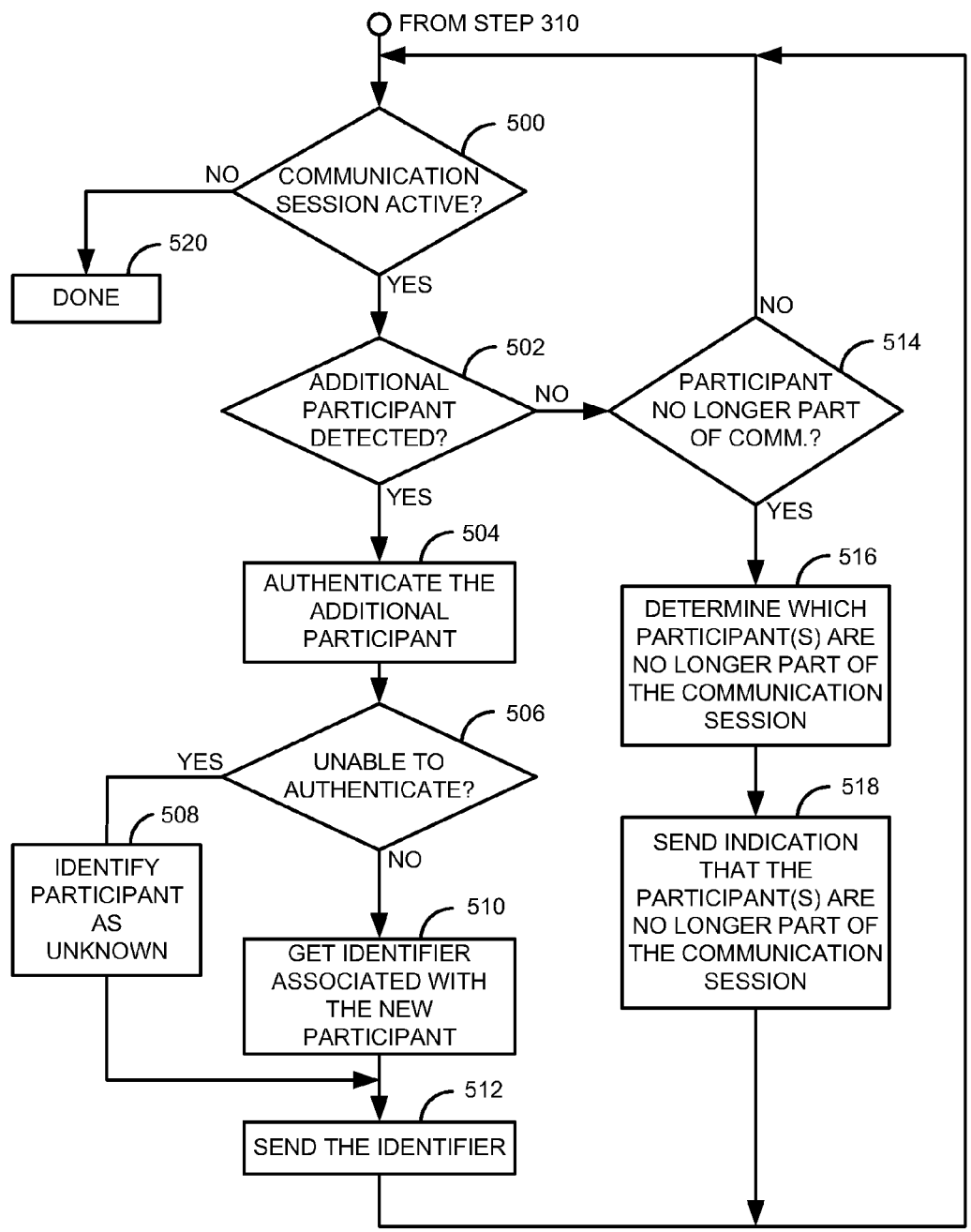
FIG. 5 is a flow diagram of a method for determining if a participant has either joined or is no longer present in a communication session.

FIG. 5 is a flow diagram of a method for determining if a participant has either joined or is no longer present in the communication session. The process starts after the communication address 130 is sent in step 310. The network interface 203 determines in step 500 if the communication session is active. If the communication session is no longer active in step 500, the process is done 520.

Otherwise, if the communication session is active in step 500, the authentication module 202 determines in step 502 if an additional participant has been detected. An additional participant can be detected in step 502 in various ways such as detecting the new participant speaking in the communication session, recognizing a new participant by performing a face print, and the like. If the additional participant is detected in step 502, the authentication module 202 authenticates 504 the additional participant. If the additional participant cannot be authenticated in step 506, the authentication module 202 identifies 508 the additional participant as unknown. Otherwise, if the authentication module 202 can authenticate the additional participant in step 506, the authentication module 202 gets 510 the identifier 110 associated with the new participant. The network interface 203 then sends 512 the identifier 110 (of the additional participant or as unknown). The process then goes to step 500.

If in step 502 an additional participant is not detected, the authentication module 202 determines in step 514 if a participant who was previously part of the communication session is no longer part of the communication session. The authentication module 202 can determine if a participant is no longer part of the communication session in various ways. For example, the authentication module 202 can determine that one of the participants has left a room by visually tracking participants and detecting when they leave the room. The authentication module 202 can also detect the presence based on other methods such as Global Positioning Satellite (GPS) (e.g., detecting that the participant has left an area around the source communication device 201), biometrics of persons leaving the room, Radio Frequency Identifiers (RFID), and the like. If the authentication module 202 determines in step 514 that no participants have left the communication session in step 514, the process goes to step 500.

Otherwise, if the authentication module 202 in step 514 determines that one or more participant(s) are no longer part of the communication session, the authentication module 202 determines 516 which participant(s) (known and unknown) are no longer part of the communication session. The authentication module 202 sends 518 an indication that the participant(s) are no longer part of the communication session to the destination communication device 220. The process then goes to step 500.

For example, Joe White, Sally Black, and an unknown participant are currently on a communication session at the source communication device 201. If Sally Black and the unknown participant were to get up and leave a video conference room, the authentication module 202 determines 514 that two participants have left the room. The authentication module 202 determines 516 that Sally Black and the unknown participant have left the room based on their authentication metrics 120 and are no longer part of the video conference.

The network interface then sends 518 to the destination communication device 220, an indication that Sally Black and the unknown participant are no longer part of the communication session.

Figure 6:
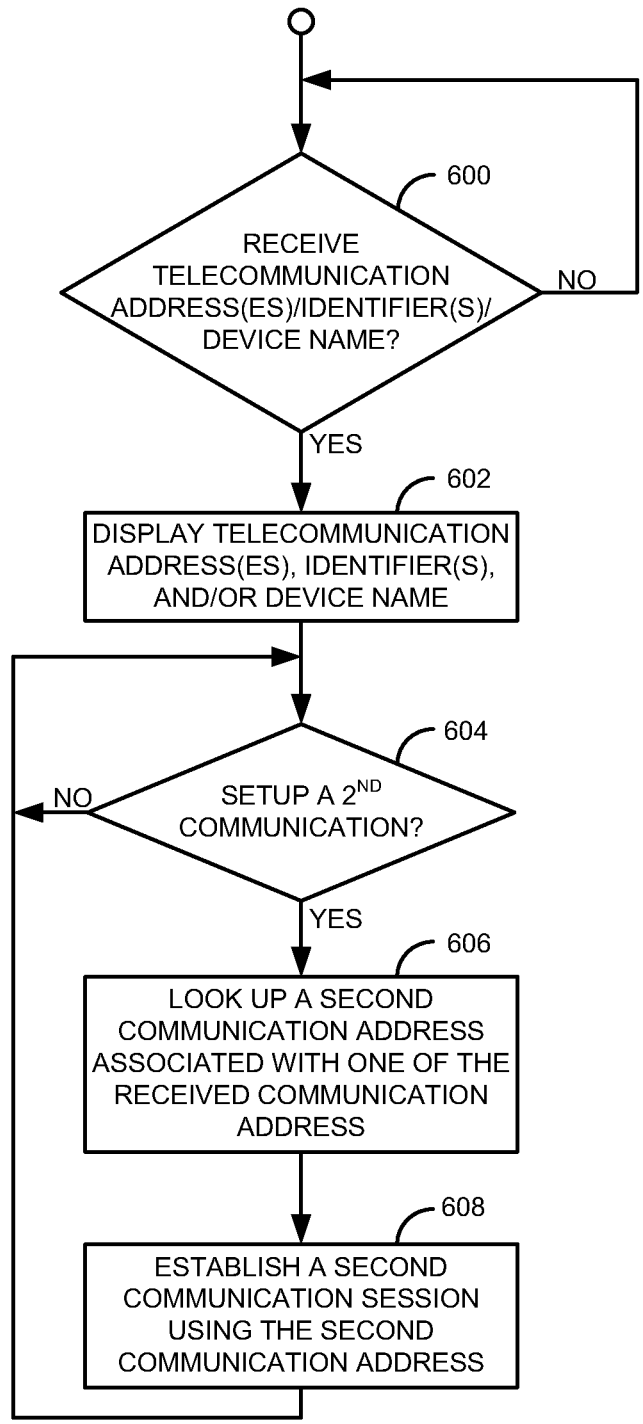
FIG. 6 is a flow diagram of a method for receiving telecommunication information, displaying telecommunication information, and setting up a second communication.

FIG. 6 is a flow diagram of a method for receiving telecommunication information, displaying the telecommunication information, and setting up a second communication. The destination communication device 220 waits in step 600 to receive the telecommunication address 130 (or addresses), the identifier(s,) 110 and/or the communication device name 140 sent by the source communication device 201 in steps 310, 420, 512, and/or 518. If the telecommunication address 130 (or addresses), the identifier(s,) 110 and/or the communication device name 140 are not received, the destination communication device 220 waits at step 600.

Otherwise, if the destination communication device receives in step 600 the telecommunication address 130 (or addresses), the identifier(s,) 110, and/or the communication device name 140, the destination communication device 220 displays 602 the telecommunication address (or addresses) 130, the identifier(s,) 110, and/or the communication device name 140 in the display 221. How the information is displayed can be done in various ways depending on implementation and the information that was sent by the source communication device 202.

For example, if Linda Jones calls from her home phone, the information displayed in step 602 would say "Linda Jones calling from Linda Jones' home phone." If Bob and Linda Jones are calling from their home phone, the information displayed in step 602 could be "Bob Jones and Linda Jones calling from Bob Jones' home phone." If Sally Black, Joe White, and an unknown participant are calling from conference room B6, the message displayed in step 602 would be "Sally Black, Joe White, and an unknown participant are calling from conference room B6." The message could also be presented using other mechanisms such as playing an audio message.

The destination communication device 220 determines in step 604 if a user of the destination communication device 220 wants to set up a second communication. If the user does not want to set up a second communication, the process waits in step 604. Otherwise, if the user wants to set up a second communication in step 604, the destination communication device 220 looks up a second communication address that is associated with one of the received telecommunication addresses 130/identifiers 110 sent from the source destination device 201. The destination communication device 220 establishes 608 a second communication using the second communication address.

For example, after receiving the telephone number of Sally Black (712-444-0909) from the source communication device 201, the destination communication device 220 looks up Sally Black's Instant Messaging (IM) address from her telephone number. The destination communication device 220 then establishes an Instant Messaging session with Sally Black. The user of the destination communication device 220 then can send Instant Messages to Sally Black.

Figure 7:
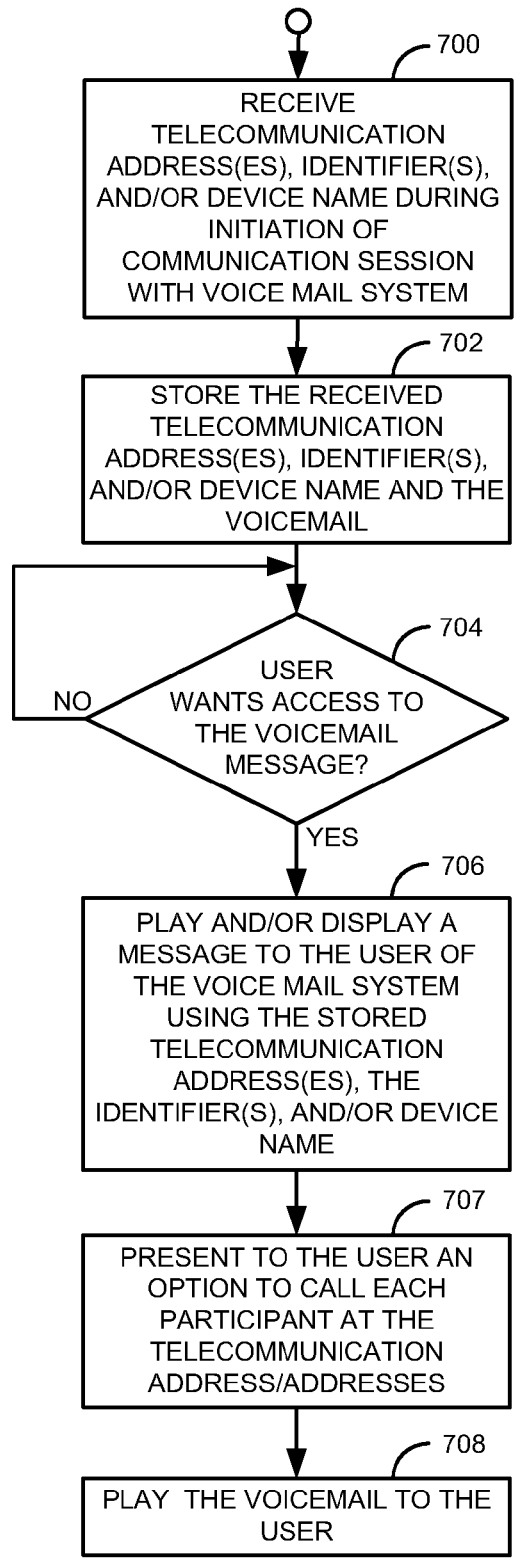
FIG. 7 is a flow diagram of a method for receiving telecommunication information in a voicemail system.

FIG. 7 is a flow diagram of a method for receiving telecommunication information in a voicemail system 230. The process begins when the voicemail system 230 receives 700 the telecommunication address (or addresses) 130, the identifier(s) 110, and/or the communication device name 140 (e.g., sent using the method described in FIG. 4) during the initiation of a communication session with the voicemail system 230. The voicemail system 230 stores 702 the received telecommunication address (or addresses) 130, the identifier(s) 110, and/or the communication device name 140.

The voicemail system 230 waits in step 704 until a user wants to access the voicemail system 230. When the user wants to access the voicemail system 230 in step 704, the voicemail system 230 plays and/or displays 706 a message to the user of the voicemail system 230 using the stored telecommunication address (or addresses) 130, the identifier(s) 110, the communication device name 140, and/or a telecommunication address associated with the source communication device 201. The voicemail system 230 can play a message or display various combinations of the telecommunication address (or addresses) 130, the identifier(s) 110, the communication device name 140 and/or the telecommunication address associated with the source communication device 201. The voicemail system 230 presents 707 to the user of the voicemail system 203 the option to call each participant at the telecommunication address and/or the source communication device 201. The voicemail system 230 then plays 708 the voice message to the user.

For example, a voicemail is received and the telecommunication address 130 is SB@Avaya.com, the identifier 110 is Sally Black, and the communication device name 140 is Sally Black's cell phone. The message that can be displayed and/or played when the user of the voicemail system accesses his or her voicemail could be "Sally Black calling from Sally Black's Cell phone, SB@Avaya.com."

If a call is received from conference room B6 from Joe White and Sally Black, and includes the telecommunication addresses of conference room B6, Joe White, and Sally Black, the voicemail system 230 can give the user the option to call conference room B6, Joe White, and/or Sally Black. This can be in the form of a message that states "press 1 to call conference room B6, press 2 to call Joe White, press 3 to call Sally Black, or press 9 to listen to the voice message." The option to call conference room B6, Joe White, and Sally Black could also be presented after the voice message is played to the user.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
receiving, by a destination communication device, at least one telecommunication address, wherein the at least one telecommunication address is associated with one or more individual participants in a first communcation session between a source communication device and the destination communication device, wherein the first communication session comprises a call, and wherein the at least one telecommunication address is not associated with the source communication device;
determining, by the destination communication device, if a second communication session with the one or more individual participants is to be established;
automatically looking up, by the destination communication device and in response to the determining, a second telecommunication address associated with the at least one telecommunication address; and
automatically establishing, by the destination communication device and during the first communication session, the second communication session with the one or more individual participants using the second telecommunication address.

2. The method of claim 1, wherein the one or more individual participants comprises a plurality of participants and obtaining the at least one telecommunication address further comprises obtaining an individual telecommunication address for each of the plurality of participants; and
sending further comprises sending each of the individual telecommunication addresses during the initiation of the first communication session.

3. The method of claim 2, wherein the source communication device has an associated telecommunication address and sending further comprises sending the telecommunication address associated with the source communication device.

4. The method of claim 2, further comprising:
receiving at a voicemail system, the telecommunication addresses of each individual participant and the source communication device telecommunication address; and
presenting an option for a user of the voicemail system, during a voicemail session, to call individual participants using their individual telecommunication address or call the source telecommunication device.

5. The method of claim 1, wherein the one or more individual participants are a plurality of participants, wherein the at least one telecommunication address is a single telecommunication address, and further comprising:
obtaining an individual identifier associated with each of the corresponding authentication metrics; and
wherein sending further comprises sending each of the individual identifiers.

6. The method of claim 5, wherein the single telecommunication address is associated with the one of the one or more individual participants based on the one of the one or more individual participants having a relationship with the source communication device.

7. The method of claim 5, further comprising:
determining if none of the individual participants can be authenticated and when none of the individual participants can be authenticated, denying the communication session; and
determining if at least one of the individual participants can be authenticated and when at least one of the individual participants cannot be authenticated;
sending an identifier indicating that the at least one of the individual participants that cannot be authenticated is unknown.

8. The method of claim 5, further comprising:
authenticating an additional participant in the first communication session with an additional authentication metric, wherein the authenticating occurs after the initiation of the first communication session;
getting an additional identifier associated with the additional authentication metric; and
sending the additional identifier during the first communication session.

9. The method of claim 5, further comprising:
determining that one of the individual participants is no longer part of the communication session based on detecting that the one of the individual participants is no longer within the presence of the source communication device; and
sending an indication that the one of the individual participants is no longer part of the communication session.

10. The method of claim 5, further comprising:
obtaining a device name that is associated with the source communication device; and
sending the device name during the initiation of the first communication session.

11. The method of claim 10, further comprising:
receiving the single telecommunication address, each of the individual identifiers, and the device name at a voicemail system; and
playing and/or displaying a message to a user of the voicemail system, wherein the message comprises: one or more of (i) an indication of the single telecommunication address, an indication of the device name, and a message looked up from the telecommunication address and (ii) the individual identifiers.

12. The method of claim 1, wherein the at least one telecommunication address is a plurality of telecommunication addresses associated with one of the one or more individual participants and sending further comprises sending the plurality of telecommunication addresses.

13. The method of claim 1, wherein the telecommunication address is at least one of the following: a numeric telephone number, an alpha-numeric a Universal Resource Locator (URL), an alpha-numeric telephone number, an URL, and an Internet Protocol (IP) address).

14. The method of claim 1, wherein the source communication device authenticates each of the one or more individual participants in the first communication session using a corresponding authentication metric for each individual participant, wherein each corresponding authentication metric is not a telecommunication address, and wherein the corresponding authentication metric is at least one of the following: a voice print, a face print, a retinal scan, a password, a finger print, and a scheduled time period.

15. The method of claim 1, wherein the at least one telecommunication address is associated with a plurality of identifiers and wherein each of the plurality of identifiers identifies a specific person.

16. The method of claim 1, wherein the at least one telecommunication address is associated with a plurality of identifiers and wherein each of the plurality of identifies a specific person.

17. A system comprising:
a destination communication device that: receives at least one telecommunication address, wherein the at least one telecommunication address is associated with one or more individual participants in a first communication session between a source communication device and the destination communication device, wherein the first communication session comprises a call, and wherein the at least one telecommunication address is not associated with the source communication device; determines if a second communication session with the one or more individual participants is to be established; in response to the determining that the second communication session with the one or more individual participants is to be established automatically looks up a second telecommunication address associated with the at least one received telecommunication address, and automatically establishes the second communication session, during the first communication session, with the one or more individual participants using the second telecommunication address.

18. The system of claim 17, wherein:
the one or more individual participants comprises a plurality of participants;
an authentication module, when executed by a microprocessor, gets an individual telecommunication address for each of the plurality of participants; and
the network interface sends each of the individual telecommunication addresses during the initiation of the first communication session.

19. The system of claim 18, wherein the source communication device has an associated telecommunication address and the network interface sends the telecommunication address associated with the source communication device.

20. The system of claim 18, further comprising a voicemail system that receives the telecommunication addresses of each individual participant and the source communication device telecommunication address, and presents an option for a user of the voicemail system, during a voicemail session, to call individual participants using their individual telecommunication address or call the source telecommunication device.

21. The system of claim 17, wherein the one or more individual participants are a plurality of participants, and wherein:
the at least one telecommunication address is a single telecommunication address;
an authentication module that, when executed by a microprocessor, gets an individual identifier associated with each of the corresponding authentication metrics; and
the network interface sends each of the individual identifiers.

22. The system of claim 21, wherein the single telecommunication address is associated with the one of the one or more individual participants based on the one of the one or more individual participants having a relationship with the source communication device.

23. The system of claim 21, wherein the authentication module, when executed by a microprocessor:
determines if none of the individual participants can be authenticated, and when none of the individual participants can be authenticated, denies the first communication session,
determines if at least one of the individual participants can be authenticated and when at least one of the individual participants cannot be authenticated, sends an identifier indicating that the at least one of the individual participants that cannot be authenticated is unknown.

24. The system of claim 21, wherein the authentication module, when executed by a microprocessor, authenticates an additional participant in the first communication session with an additional authentication metric, wherein the authenticating occurs after the initiation of the first communication session, and gets an additional identifier associated with the additional authentication metric; and the network interface sends the additional identifier during the first communication session.

25. The system of claim 21, wherein:
the authentication module, when executed by a microprocessor, determines that one of the individual participants is no longer part of the first communication session based on detecting that the one of the individual participants is no longer within the presence of the source communication device; and
the network interface sends an indication that the one of the individual participants is no longer part of the first communication session.

26. The system of claim 21, wherein the authentication module, when executed by a microprocessor, gets a device name that is associated with the source communication device and the network interface sends the device name during the initiation of the first communication session.

27. The system of claim 26, further comprising a voicemail system that:
receives the single telecommunication address, each of the individual identifiers, and the device name; and
plays and/or display a message to a user of the voicemail system, wherein the message comprises: one or more or (i) an indication of the single telecommunication address, an indication of the device name, or a message looked up from the telecommunication address and (ii) the individual identifiers.

28. The system of claim 17, wherein the at least one telecommunication address is a plurality of telecommunication addresses associated with one of the one or more individual participants and the network interface sends the plurality of telecommunication addresses.

29. The system of claim 17, wherein the telecommunication address is at least one of the following: a numeric telephone number, an alpha-numeric a Universal Resource Locator (URL), an alpha-numeric telephone number, an URL, and an Internet Protocol (IP) address).

30. The system of claim 17, further comprising an authentication module, in the source communication device, that, when executed by a microprocessor, authenticates each of the one or more individual participants in the first communication session using a corresponding authentication metric for each individual participant, wherein each corresponding authentication metric is not a telecommunication address, and obtains the at least one telecommunication address, and wherein the corresponding authentication metric is at least one of the following: a voice print, a face print, a retinal scan, a password, a finger print, and a scheduled time period.

31. The system of claim 17, wherein the at least one telecommunication address is associated with a plurality of identifiers and wherein each of the plurality of identifiers identify a specific person.

32. The system of claim 17, wherein the network interface sends during the initiation of the first communication session a device name that is related to an individual participant associated with the at least one telecommunication address.

33. The method of claim 13, wherein the second telecommunication address is at least one of the following: a numeric telephone number, an alpha-numeric Universal Resource Locator (URL), an alpha-numeric telephone number, an URL, and an Internet Protocol (IP) address); and
the second telecommunication address is different than the first telecommunication address.

34. The system of claim 29, wherein the second telecommunication address is at least one of the following: a numeric telephone number, an alpha-numeric Universal Resource Locator (URL), an alpha-numeric telephone number, an URL, and an Internet Protocol (IP) address; and the second telecommunication address is different than the first telecommunication address.

* * * * *